(12) United States Patent
Nguyen

(10) Patent No.: US 10,777,038 B2
(45) Date of Patent: *Sep. 15, 2020

(54) ELECTRONIC FUND TRANSFER FOR MOBILE GAMING

(71) Applicant: Nguyen Gaming LLC, Reno, NV (US)

(72) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,975

(22) Filed: Apr. 24, 2017

(65) Prior Publication Data
US 2017/0243440 A1 Aug. 24, 2017

Related U.S. Application Data

(62) Division of application No. 13/632,743, filed on Oct. 1, 2012, now Pat. No. 9,672,686.

(60) Provisional application No. 61/542,703, filed on Oct. 3, 2011.

(51) Int. Cl.
G07F 17/32 (2006.01)
G06Q 20/12 (2012.01)
G06Q 20/32 (2012.01)
G06Q 20/10 (2012.01)

(52) U.S. Cl.
CPC ........ *G07F 17/3244* (2013.01); *G06Q 20/10* (2013.01); *G06Q 20/123* (2013.01); *G06Q 20/3224* (2013.01); *G07F 17/3209* (2013.01); *G07F 17/3211* (2013.01); *G07F 17/3218* (2013.01); *G07F 17/3225* (2013.01);
(Continued)

(58) Field of Classification Search
CPC ........... G07F 17/3218; G07F 17/3251; G07Q 20/123
USPC ...................................... 463/40-42
See application file for complete search history.

(56) References Cited

U.S. PATENT DOCUMENTS 2,033,638 A 3/1936 Koppl
2,062,923 A 12/1936 Nagy
4,741,539 A 5/1988 Sutton et al.
(Continued)

FOREIGN PATENT DOCUMENTS

GB 2033638 5/1980
GB 2062923 5/1981
(Continued)

OTHER PUBLICATIONS

Benston, Liz, "Harrahs Launches iPhone App; Caesars Bypasses Check-in," Las Vegas Sun, Las Vegas, NV. Jan. 8, 2010.
(Continued)

*Primary Examiner* — Omkar A Deodhar
*Assistant Examiner* — Ross A Williams

(57) ABSTRACT

In one embodiment, a system and method to transfer money may include a mobile device associated with a player, a location server designed to: track a device position of the mobile device and track a vessel position, and a mobile gaming management server designed to: receive a fund transfer request from a gaming server for the mobile device, the fund transfer request including a fund amount; determine if the fund amount can be transferred to the mobile device based on the device position and the vessel position; and transfer the fund amount to the mobile device if it is determined that the fund amount can be transferred to the mobile device.

20 Claims, 8 Drawing Sheets

(52) U.S. Cl.
CPC ...... *G07F 17/3251* (2013.01); *G07F 17/3288* (2013.01); *G06Q 20/3223* (2013.01)

(56) References Cited

U.S. PATENT DOCUMENTS

| | | | |
|---|---|---|---|
| 4,948,138 A | 8/1990 | Pease et al. |
| 5,067,712 A | 11/1991 | Georgilas |
| 5,275,400 A | 1/1994 | Weingardt |
| 5,429,361 A | 7/1995 | Raven et al. |
| 5,489,103 A | 2/1996 | Okamoto |
| 5,630,757 A | 5/1997 | Gagin |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,842,921 A | 12/1998 | Mindes |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,271 A | 11/2000 | Kadici |
| 6,146,273 A | 11/2000 | Olsen |
| 6,165,071 A | 12/2000 | Weiss |
| 6,231,445 B1 | 5/2001 | Acres |
| 6,244,958 B1 | 6/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,353,390 B1 | 3/2002 | Beri et al. |
| 6,364,768 B1 | 4/2002 | Acres et al. |
| 6,404,884 B1 | 6/2002 | Marwell et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,505,095 B1 | 1/2003 | Kolls |
| 6,508,710 B1 | 1/2003 | Paravia et al. |
| 6,561,900 B1 | 5/2003 | Baerlocker et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,719,630 B1 | 4/2004 | Seelig et al. |
| 6,749,510 B2 | 6/2004 | Globbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Bearlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| 7,198,571 B2 | 4/2007 | LeMay |
| RE39,644 E | 5/2007 | Alcorn et al. |
| 7,217,191 B2 | 5/2007 | Allen et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,311,608 B1 | 12/2007 | Danieli |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,431,650 B2 | 10/2008 | Kessman |
| 7,448,949 B2 | 11/2008 | Kaminkow et al. |
| 7,500,913 B2 | 3/2009 | Baerlocher |
| 7,510,474 B2 | 3/2009 | Carter |
| 7,513,828 B2 | 4/2009 | Nguyen et al. |
| 7,519,838 B1 | 4/2009 | Suurballe |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,693,306 B2 | 4/2010 | Huber |
| 7,699,703 B2 | 4/2010 | Muir et al. |
| 7,722,453 B2 | 5/2010 | Lark et al. |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |

(56) References Cited

U.S. PATENT DOCUMENTS

| | | |
|---|---|---|
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh |
| 8,133,113 B2 | 3/2012 | Nguyen |
| 8,182,326 B2 | 5/2012 | Speers et al. |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |
| 8,403,758 B2 | 3/2013 | Homik |
| 8,430,745 B2 | 4/2013 | Agarwal et al. |
| 8,461,958 B2 | 6/2013 | Saenz |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether |
| 8,613,659 B2 | 12/2013 | Nelson et al. |
| 8,696,470 B2 | 4/2014 | Nguyen |
| 8,745,417 B2 | 6/2014 | Huang et al. |
| 8,834,254 B2 | 9/2014 | Buchholz et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,235,952 B2 | 1/2016 | Nguyen |
| 9,292,996 B2 | 3/2016 | Davis et al. |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,576,425 B2 | 2/2017 | Nguyen |
| 9,626,826 B2 | 4/2017 | Nguyen |
| 9,666,021 B2 | 5/2017 | Nguyen |
| 9,672,686 B2 * | 6/2017 | Nguyen .............. G07F 17/3218 |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi et al. |
| 10,140,816 B2 | 11/2018 | Nguyen |
| 10,421,010 B2 | 9/2019 | Nguyen |
| 10,438,446 B2 | 10/2019 | Nguyen |
| 10,445,978 B2 | 10/2019 | Nguyen |
| 2001/0004607 A1 | 6/2001 | Olsen |
| 2001/0016516 A1 | 8/2001 | Takatsuka |
| 2001/0024971 A1 | 9/2001 | Brossard |
| 2001/0031659 A1 | 10/2001 | Perrie |
| 2001/0047291 A1 | 11/2001 | Garahi |
| 2002/0006822 A1 | 1/2002 | Krintzman |
| 2002/0042295 A1 | 4/2002 | Walker et al. |
| 2002/0043759 A1 | 4/2002 | Vancura |
| 2002/0045474 A1 | 4/2002 | Singer |
| 2002/0107065 A1 | 8/2002 | Rowe |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1 | 10/2002 | Lark et al. |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0152120 A1 | 10/2002 | Howington |
| 2002/0167536 A1 | 11/2002 | Valdes et al. |
| 2002/0177483 A1 | 11/2002 | Cannon |
| 2002/0183105 A1 | 12/2002 | Cannon et al. |
| 2003/0001338 A1 | 1/2003 | Bennett et al. |
| 2003/0003996 A1 | 1/2003 | Nguyen |
| 2003/0004871 A1 * | 1/2003 | Rowe .................... G06Q 20/10 705/39 |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |
| 2003/0100361 A1 | 5/2003 | Sharpless et al. |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0038736 A1 | 2/2004 | Bryant |
| 2004/0048650 A1 | 3/2004 | Mierau et al. |
| 2004/0068460 A1 | 4/2004 | Feeley |
| 2004/0082385 A1 | 4/2004 | Silva et al. |
| 2004/0106449 A1 | 6/2004 | Walker et al. |
| 2004/0127277 A1 | 7/2004 | Walker |
| 2004/0127290 A1 | 7/2004 | Walker et al. |
| 2004/0137987 A1 | 7/2004 | Nguyen et al. |
| 2004/0147308 A1 | 7/2004 | Walker et al. |
| 2004/0152508 A1 | 8/2004 | Lind |
| 2004/0199631 A1 * | 10/2004 | Natsume ................ H04L 67/18 709/225 |
| 2004/0214622 A1 | 10/2004 | Atkinson |
| 2004/0224753 A1 | 11/2004 | Odonovan et al. |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0130731 A1 | 6/2005 | Englman |
| 2005/0137014 A1 | 6/2005 | Vetelaninen |
| 2005/0170883 A1 | 8/2005 | Muskin et al. |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 * | 8/2005 | Amaitis .................. G07F 17/32 463/42 |
| 2005/0202875 A1 | 9/2005 | Murphy et al. |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0239546 A1 | 10/2005 | Hedrick |
| 2005/0255919 A1 | 11/2005 | Nelson |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |

(56) References Cited

U.S. PATENT DOCUMENTS

| | | |
|---|---|---|
| 2006/0046830 A1 | 3/2006 | Webb |
| 2006/0046849 A1 | 3/2006 | Kovacs |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitas et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0093299 A1 | 4/2007 | Bergeron |
| 2007/0129123 A1 | 6/2007 | Eryou et al. |
| 2007/0129148 A1 | 6/2007 | Van Luchene |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0238505 A1 | 10/2007 | Okada |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259717 A1 | 11/2007 | Mattice et al. |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0020845 A1 | 1/2008 | Low |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076505 A1 | 3/2008 | Nguyen |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102916 A1 | 5/2008 | Kovacs |
| 2008/0102956 A1 | 5/2008 | Burman et al. |
| 2008/0102957 A1 | 5/2008 | Burnman et al. |
| 2008/0113772 A1 | 5/2008 | Burrill et al. |
| 2008/0119267 A1 | 5/2008 | Denlay |
| 2008/0126529 A1* | 5/2008 | Kim ................. H04W 4/02 709/223 |
| 2008/0139306 A1 | 6/2008 | Lutnick |
| 2008/0146321 A1 | 6/2008 | Parente |
| 2008/0146344 A1 | 6/2008 | Rowe et al. |
| 2008/0150902 A1 | 6/2008 | Edpalm et al. |
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0182667 A1 | 7/2008 | Davis et al. |
| 2008/0200251 A1 | 8/2008 | Alderucci |
| 2008/0207307 A1 | 8/2008 | Cunningham, II et al. |
| 2008/0214258 A1 | 9/2008 | Brosnan et al. |
| 2008/0215319 A1 | 9/2008 | Lu |
| 2008/0234047 A1 | 9/2008 | Nguyen |
| 2008/0238610 A1 | 10/2008 | Rosenbereg |
| 2008/0248849 A1 | 10/2008 | Lutnick |
| 2008/0248865 A1 | 10/2008 | Cole |
| 2008/0252419 A1 | 10/2008 | Batchelor |
| 2008/0254878 A1 | 10/2008 | Sauders et al. |
| 2008/0254881 A1 | 10/2008 | Lutnick et al. |
| 2008/0254883 A1 | 10/2008 | Patel et al. |
| 2008/0254891 A1 | 10/2008 | Sauders et al. |
| 2008/0254892 A1 | 10/2008 | Sauders et al. |
| 2008/0254897 A1 | 10/2008 | Sauders et al. |
| 2008/0263173 A1 | 10/2008 | Weber et al. |
| 2008/0300058 A1 | 12/2008 | Sum et al. |
| 2008/0305864 A1 | 12/2008 | Kelly et al. |
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1 | 1/2009 | Englman |
| 2009/0017906 A1 | 1/2009 | Jackson |
| 2009/0021381 A1 | 1/2009 | Higuchi |
| 2009/0029766 A1 | 1/2009 | Lutnick et al. |
| 2009/0054149 A1 | 2/2009 | Brosnan et al. |
| 2009/0077396 A1 | 3/2009 | Tsai et al. |
| 2009/0088258 A1 | 4/2009 | Saunders |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131146 A1 | 5/2009 | Arezina et al. |
| 2009/0131151 A1 | 5/2009 | Harris et al. |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0143141 A1 | 6/2009 | Wells |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0163272 A1 | 6/2009 | Baker |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0270170 A1 | 10/2009 | Patton |
| 2009/0271287 A1 | 10/2009 | Halpern |
| 2009/0275410 A1 | 11/2009 | Kisenwether et al. |
| 2009/0275411 A1 | 11/2009 | Kisenwether et al. |
| 2009/0280910 A1 | 11/2009 | Gagner et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0049738 A1 | 2/2010 | Mathur et al. |
| 2010/0056248 A1 | 3/2010 | Acres |
| 2010/0062833 A1 | 3/2010 | Mattice et al. |
| 2010/0062840 A1 | 3/2010 | Herrmann et al. |
| 2010/0079237 A1 | 4/2010 | Falk |
| 2010/0081501 A1 | 4/2010 | Carpenter et al. |
| 2010/0081509 A1 | 4/2010 | Burke |

(56) References Cited

U.S. PATENT DOCUMENTS

| | | |
|---|---|---|
| 2010/0099499 A1 | 4/2010 | Amaitis et al. |
| 2010/0106612 A1 | 4/2010 | Gupta |
| 2010/0115591 A1 | 5/2010 | Palermo |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0184509 A1 | 7/2010 | Sylla |
| 2010/0197383 A1 | 8/2010 | Rader et al. |
| 2010/0197385 A1 | 8/2010 | Aoki et al. |
| 2010/0203955 A1 | 8/2010 | Sylla |
| 2010/0203963 A1 | 8/2010 | Allen |
| 2010/0227662 A1 | 9/2010 | Speers et al. |
| 2010/0227670 A1 | 9/2010 | Arezine et al. |
| 2010/0227671 A1 | 9/2010 | Laaroussi |
| 2010/0227687 A1 | 9/2010 | Speers et al. |
| 2010/0234091 A1 | 9/2010 | Baerlocher et al. |
| 2010/0279764 A1 | 11/2010 | Allen et al. |
| 2010/0323780 A1 | 12/2010 | Acres |
| 2010/0325703 A1 | 12/2010 | Etchegoyen |
| 2011/0009181 A1 | 1/2011 | Speers et al. |
| 2011/0039615 A1 | 2/2011 | Acres |
| 2011/0053679 A1 | 3/2011 | Canterbury et al. |
| 2011/0065492 A1 | 3/2011 | Acres |
| 2011/0105216 A1 | 5/2011 | Cohen |
| 2011/0111827 A1 | 5/2011 | Nicely et al. |
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0244952 A1 | 10/2011 | Schueller |
| 2011/0263318 A1 | 10/2011 | Agarwal et al. |
| 2011/0269548 A1 | 11/2011 | Barclay et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028703 A1 | 2/2012 | Anderson et al. |
| 2012/0028718 A1 | 2/2012 | Barclay et al. |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer, II |
| 2012/0239566 A1 | 9/2012 | Everett |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005443 A1 | 1/2013 | Kosta |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0281188 A1 | 3/2013 | Guinn |
| 2013/0103965 A1 | 4/2013 | Golembeski |
| 2013/0104193 A1 | 4/2013 | Gatto et al. |
| 2013/0132745 A1 | 5/2013 | Schoening et al. |
| 2013/0165210 A1 | 6/2013 | Nelson |
| 2013/0185559 A1 | 7/2013 | Morel |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams et al. |
| 2013/0252730 A1 | 9/2013 | Joshi |
| 2013/0316808 A1 | 11/2013 | Nelson |
| 2013/0337878 A1 | 12/2013 | Shepherd |
| 2014/0006129 A1 | 1/2014 | Heath |
| 2014/0057716 A1 | 2/2014 | Massing et al. |
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274306 A1 | 9/2014 | Crawford |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |
| 2015/0143543 A1 | 8/2015 | Phegade |
| 2016/0125695 A1 | 5/2016 | Nguyen |
| 2017/0116819 A1 | 4/2017 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0243440 A1 | 8/2017 | Nguyen |
| 2017/0337770 A1 | 11/2017 | Nguyen |
| 2018/0144581 A1 | 5/2018 | Nguyen |
| 2019/0005773 A1 | 1/2019 | Nguyen |
| 2019/0122490 A1 | 4/2019 | Nguyen |
| 2019/0122492 A1 | 4/2019 | Nguyen |
| 2019/0213829 A1 | 7/2019 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Ilinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.

(56) References Cited

OTHER PUBLICATIONS

U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 12/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.

(56) References Cited

OTHER PUBLICATIONS

Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13/843,192, dated Aug. 10, 2016.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, dated Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/801,256, dated Aug. 18, 2017.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.

(56) References Cited

OTHER PUBLICATIONS

Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action for U.S. Appl. No. 16/162.358, dated Dec. 31, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for US Patent 2019. Application No. 15/798,363, mailed Feb. 4,.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 14/017,150, dated Oct. 9, 2019.
Final Office Action for U.S. Appl. No. 15/671,133, dated Oct. 18, 2019.
Office Action for U.S. Appl. No. 15/835,448 dated Oct. 12, 2019.
Notice of Allowance for U.S. Appl. No. 15/495,975, dated Oct. 23, 2019.
Notice of Allowance for U.S Appl. No. 14/993,005, dated Nov. 27, 2019.
Final Office Action for U.S. Appl. No. 15/427,308, dated Nov. 27, 2019.
Office Action for U.S. Appl. No. 15/798,363, dated Jan. 8, 2020.

* cited by examiner

ELECTRONIC FUND TRANSFER FOR MOBILE GAMING

CROSS-REFERENCE TO RELATED APPLICATIONS

This application is a divisional of U.S. patent application Ser. No. 13/632,743, filed Oct. 1, 2012, and entitled "ELECTRONIC FUND TRANSFER FOR MOBILE GAMING," which is hereby incorporated herein by reference, and which in turn claims priority benefit of U.S. Provisional Application No. 61/542,703, filed Oct. 3, 2011, and entitled "ELECTRONIC FUND TRANSFER," which is hereby incorporated herein by reference.

FIELD OF THE INVENTION

The present disclosure relates generally to electronic fund transfer. More particularly, the present disclosure relates generally to the electronic fund transfer to a mobile device based upon location or position information of the mobile device.

BACKGROUND OF THE INVENTION

In a gaming environment, funds used to play a game of chance may be obtained from an operator by giving the operator a check. The amount may be credited to the player's account for use to play the games of chance. The player's domicile is sometimes checked and playing the games of chance may sometimes be denied.

The player can cash out from the device and receive either cash or a printed ticket to be presented to the operator. However, when playing games of chance on a mobile device, it is inefficient or not possible for the player to cash out by receiving cash or a printed ticket to be presented to the operator. Thus, electronic transfer of funds may be more efficient for users playing games of chance on a mobile device.

Overview

The invention provides for the electronic transfer of funds to or from a mobile device. The electronic transfer of funds may be used to purchase any desired products or services such as clothes, games of chance, e-books, food, movies, and the like. In one embodiment, the electronic transfer of funds may be used to play of a game of chance on the mobile device. A determination of whether to transfer the funds to the mobile device to play the game of chance may be based upon different criteria. For example, determination of whether to transfer the funds to the mobile device may be based on at least a global and local device position of the mobile device. In another example, the electronic transfer of funds to the mobile device may be based upon other predefined rules such as a time rule, captain's rule, user defined rules, and other criteria.

In one embodiment, a system for transferring money comprises a plurality of mobile devices, each of the plurality of mobile devices associated with a player and a location server operable to: track a device position of each of the plurality of mobile devices, the device position being relative to the vessel and track a vessel position, the vessel position being a global location relative to earth. The system may also have a mobile gaming management server configured to communicate with the location server and a gaming server, the mobile gaming management server operable to: receive a fund transfer request from the gaming server, the fund transfer request associated with at least one requesting mobile device, the fund transfer request including a fund amount used to play a game of chance; determine if the fund amount can be transferred to the associated mobile device based on the device position and the vessel position; and transfer the fund amount to the associated mobile device if it is determined that the fund amount can be transferred to the associated mobile device.

In another embodiment, a method for transferring funds on a vessel can include receiving a request to play a game of chance from at least one of the plurality of mobile devices, the request including a fund amount used to play the game of chance; determining whether the fund amount may be transferred to the mobile device based on at least a vessel position of the vessel and a device position of the mobile device; and transferring the fund amount to the mobile device if it is determined that the fund amount be transferred to the mobile device based on at least a vessel position of the vessel and a device position of the mobile device.

In another embodiment, a mobile gaming management device configured to transfer funds for passengers on a vessel may include at least one memory configured to store at least one passenger gaming account; and a processor configured to: (a) track gaming funds for use by at least one user of a mobile device; (b) receive a fund request including a fund amount; (c) obtain the fund amount, the fund amount used to play an on-board game of chance on the mobile device; (d) transfer the fund amount to the mobile device; (e) separately manage usage of the fund amount in a passenger gaming account, the passenger gaming account associated with the user playing the on-board game of chance; (f) accumulate any gaming wins from the on-board game of chance in the passenger gaming account; and (g) close the gaming account for the passenger at the conclusion of the vessel route.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Figure 1:
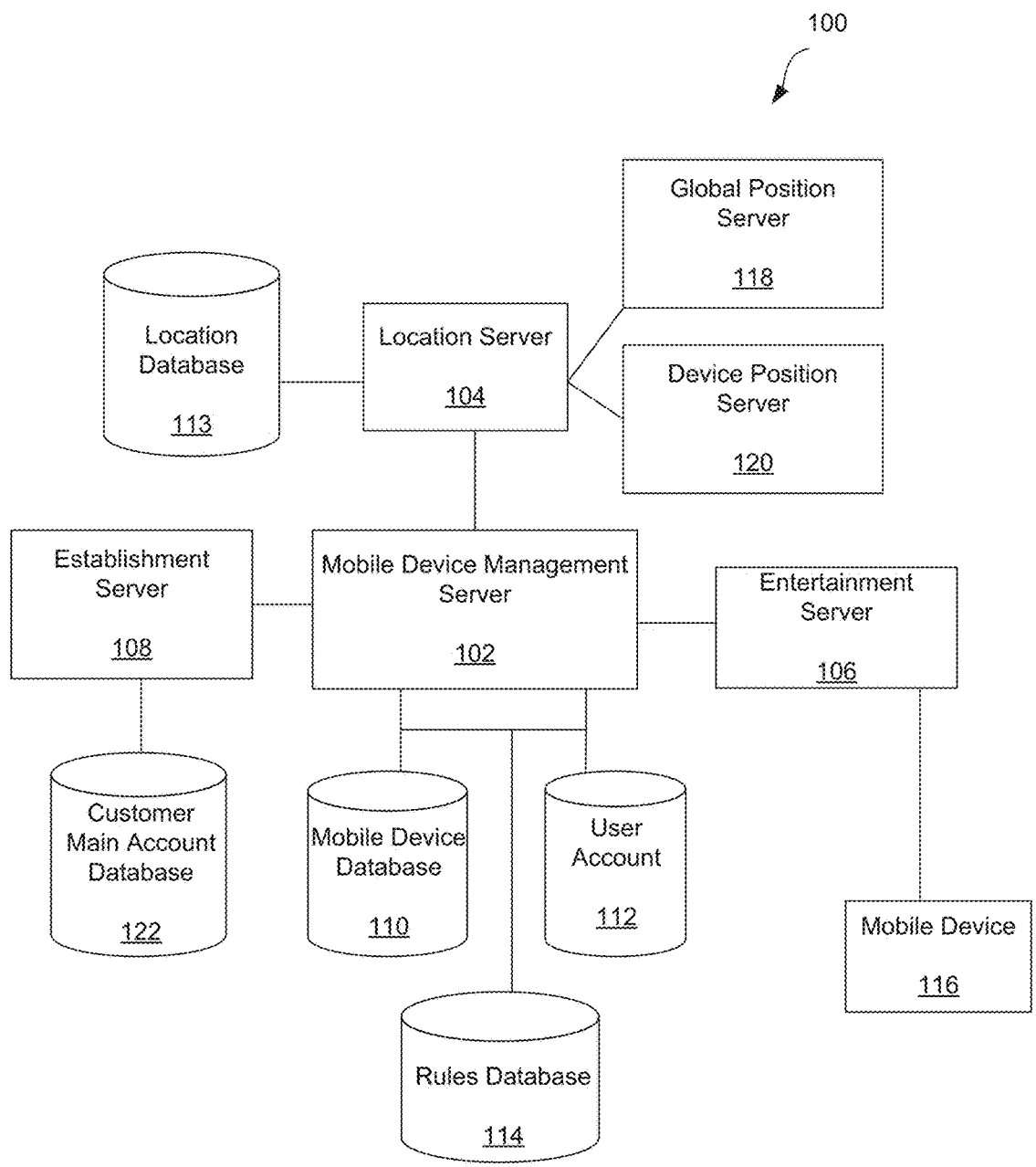
FIG. 1 is an example block diagram of an electronic fund transfer system.

Embodiments are described herein in the context of an electronic fund transfer for mobile gaming. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The invention provides for the electronic transfer of funds to or from a mobile device. The electronic transfer of funds may be used to purchase any desired products or services such as clothes, games of chance, e-books, food, movies, and the like. In one embodiment, the electronic transfer of funds may be used to play restricted entertainment activities such as playing a game of chance or sports betting on the mobile device. A determination of whether to transfer the funds to the mobile device to play the restricted entertainment activities may be based upon different criteria. For example, determination of whether to transfer the funds to the mobile device may be based on at least a global and local device position or location of the mobile device. In another example, the electronic transfer of funds to the mobile device may be based upon other predefined rules such as a time rule, captain's rule (e.g. any user desired defined rules), and other criteria. For example, if the mobile device is on a vessel (e.g., riverboats, cars, boats, cruise ships, planes, buses, or any moveable transport device), the determination of whether to transfer funds to the mobile device may be based upon at least where the device is relative to the vessel and whether the vessel is in international or national waters. In another example, if the mobile device is on an airplane, the determination of whether to transfer funds to the mobile device may be based upon at least whether the airplane is in international airspace.

In another embodiment, the electronic transfer of funds may be used to view an X-rated movie on the mobile device. A determination of whether to transfer the funds to the mobile device to play the game of chance may be based upon different criteria. For example, determination of whether to transfer the funds to the mobile device may be based on at least the device position of the mobile device. In another example, the electronic transfer of funds to the mobile device may be based upon other predefined rules such as a time rule, establishment rules, user defined rules, and other criteria. For example, if the mobile device is on a cruise ship, the determination of whether to transfer funds to the mobile device may be based upon whether the mobile device is located at an appropriate position or location to view the X-rated movie, such as in a night club and not at a child care facility or restaurant buffet line. The determination may also be based upon whether a vessel position of the vessel is in international or national waters.

FIG. 1 is an example block diagram of an electronic fund transfer system. The electronic funds transfer system 100 may have a mobile device management server 102 configured to communicate with a location server 104, an entertainment server 106, and an establishment server 108. The mobile device management server 102 may be designed as an intermediary server to store data or information such as mobile device information, rules database, user accounts, and any other desired data or information. The mobile device information may be stored in the mobile device database 110 and may include information such as the mobile device identification, information of the user using the mobile device 116, programs on the mobile device 116, and other mobile device data. The mobile device 116 may be any type of portable mobile device such as a mobile phone, a portable media player, a personal digital assistant, a portable gaming device, or any other similar device.

The user of the mobile device 116 may also have a user account stored in the user account database 112. The user account may be any information such as user contact information, available funds in the user account, and any other user information. In one embodiment, any wins from a game of chance played by the user of the mobile device 116 may be stored in the user account.

Rules may be stored in the rules database 114. The rules may be any criteria used to determine whether to permit or deny a fund transfer request made by the mobile device. For example, if the fund transfer request is to play a game of chance on the mobile device, the determination of whether to transfer the funds to the mobile device may be based on at least the device position of the mobile device and the location of the establishment. If the mobile device is, for example, located near the childcare center and the establishment, such as a cruise ship, is in international waters, the transfer fund request may be denied. However, if the user is sitting at a bar and the establishment, such as a cruise ship, is in international waters, the transfer fund request may be granted. In another example, the fund transfer request may also be based upon a time rule that may be predetermined by the establishment. For example, the establishment may set games of chance to be played between 7 a.m. to 2 a.m. Thus, if the transfer fund request is made at 3 a.m., the transfer of fund to play the game of chance may be denied. If the transfer fund request is made at 12 p.m., the transfer of fund to play the game of chance may be permitted.

The mobile device management server 102 may be configured to communicate with an entertainment server 106, which may be configured to communicate with the mobile device 116. The mobile device 116 may purchase any type of services or products from entertainment server 106 such as clothes, play a game of chance, watch television shows or movies, listen to music, read e-books, play video games, or any other desired services or products.

The location server 104 may be configured to determine the location of the mobile device 116 and the establishment. The location server 104 may have a global position server 118 to determine the location of the establishment. In one embodiment, establishment may be a mobile establishment such as a cruise ship, airplane, bus, and the like. In another embodiment, establishment may be a non-mobile establishment such as a grocery store, casino, riverboat, and the like. Global position server 118 may use any known position or location method to determine the location of the establishment such as cellular positioning, triangulation, global positioning systems, or any other location or positioning determining method.

The location server 104 may also have a device position server 120 designed or configured to determine the position or location of the mobile device 116 relative to the establishment. In one example, if the establishment is a cruise ship, the device position of the mobile device 116 is the position of the mobile device 116 relative to the cruise ship. The device position server 120 may use any known position or location method to determine the location of the mobile device 116 such as cellular positioning, triangulation, global positioning systems, or any other location or positioning determining method.

The location server 104 may have a location database 113 to store the global position of the establishment and the device position of the mobile device. The global position and device position may be associated with a mobile device.

Mobile device management server 102 may also be configured to communicate with an establishment server 108. Establishment server 108 may be configured to store customer information in the customer main account database 122. The establishment server 108 may store information such as customer credit card information, address, username and password, date of birth, and any other desired information.

EXAMPLE

The example described below is for illustrative purposes only and is not intended to be limiting Although example embodiments illustrate the vessel as a cruise ship, this is not intended to be limiting as the vessel may be an airplane, bus, car, train, riverboat, or any other movable transport device. In another example, the service requested is to play a game of chance, however, any other type of services or products, such as to watch a movie, listen to music, and the like may be requested.

When boarding a cruise ship, the passenger's information may be stored in the customer main account 122 in the establishment server 108. The passenger's information may include financial information such as credit card information, address, birth date, family members, room number, room key number, username and password, and any other passenger information.

The passenger may be associated with a mobile device 116 to obtain services or products. In one embodiment, the mobile device 116 may be provided to the passenger. In another embodiment, the passenger may utilize his own mobile device 116. The passenger may request a transfer of funds to play a game of chance using the mobile device 116. The request may include a fund amount of $200.00 and the request to play Wheel of Fortune®. The passenger may also be authenticated and/or verified by including the passenger's username and password with the request. However, any other authentication and/or verification method may be used to authenticate and/or verify the user of the mobile device such as biometric verification (i.e. voice recognition, retinal scan, fingerprint verification, and the like).

The request to transfer funds may be transmitted from the mobile device 116 to the entertainment server 106. The entertainment server 106 may transmit the request to the mobile device management server 102. The mobile device management server 102 may determine whether the passenger has a user account 112. If the passenger does not have a user account 112, a user account 112 may be created for the passenger.

Figure 2A:
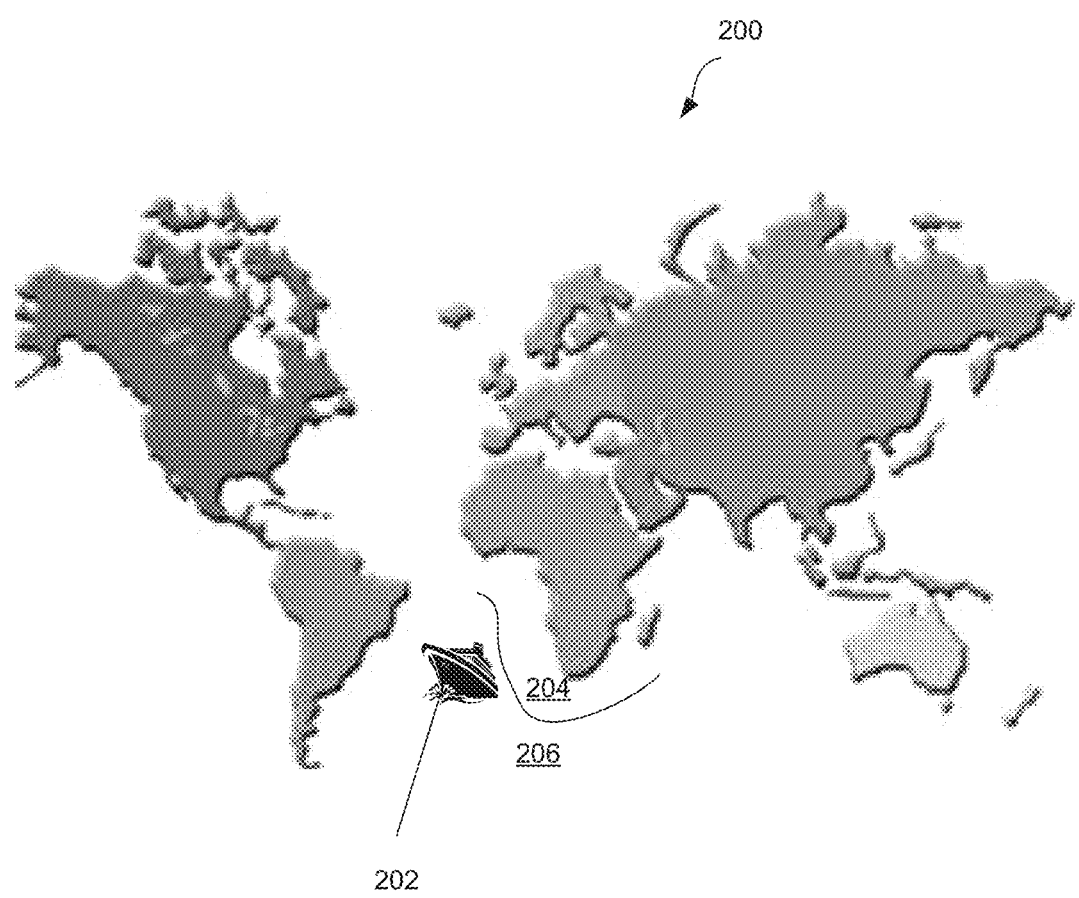
FIG. 2A illustrates an example diagram of a vessel position of a cruise ship.

The mobile device management server 102 may obtain location information from the location server 104. The global position server 118 may determine a global ship position of the vessel relative to the world or earth. Referring to FIG. 2A, an example diagram of a ship location of a cruise ship, the global position server may use any location or position determination methods to determine the location of the cruise ship 202. The cruise ship 202 may be positioned or located in international waters 206 or national waters 204. Thus, the ship location may be a global location relative to the world or earth 200. As illustrated, the cruise ship 202 is located in international waters 206.

Figure 2B:
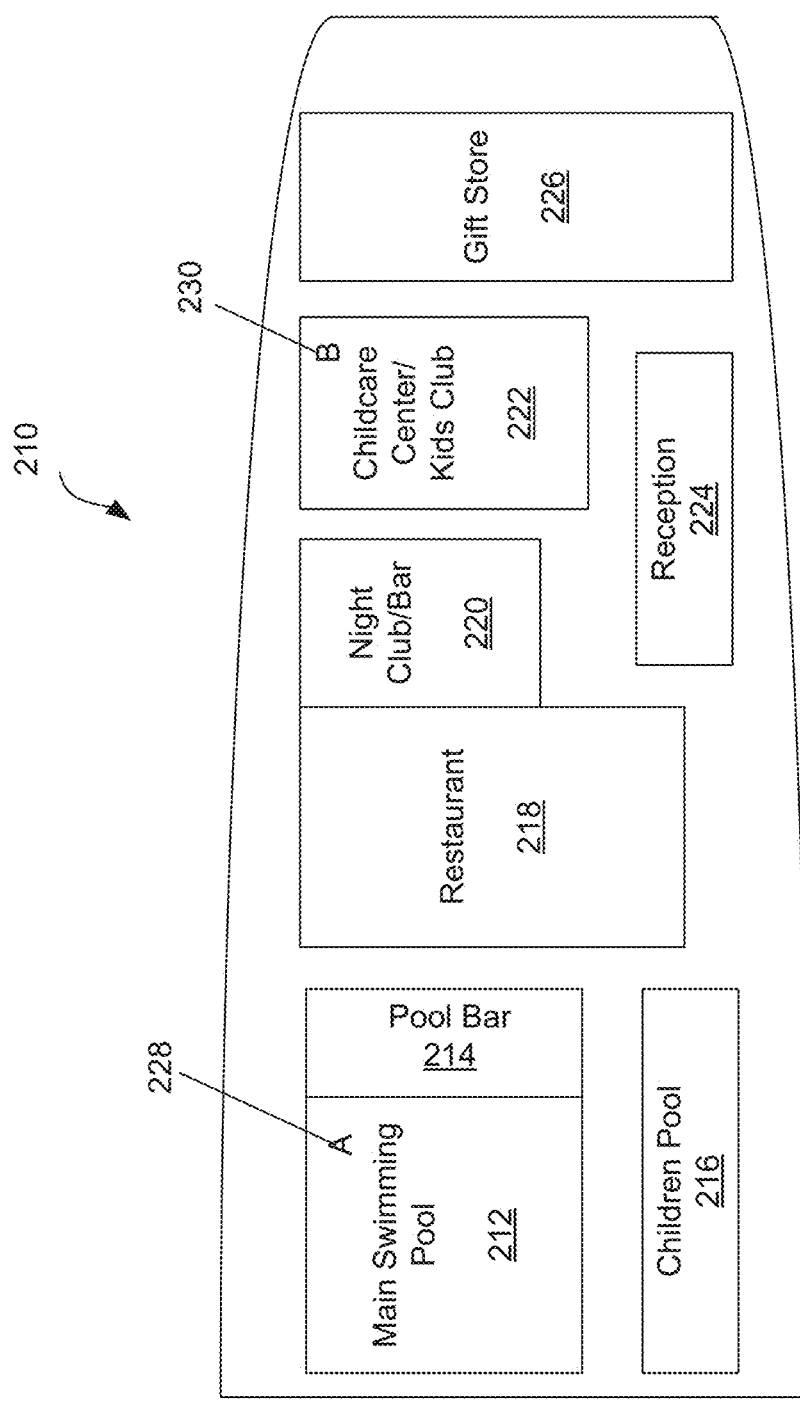
FIG. 2B illustrates an example layout of a cruise ship

Referring back to FIG. 1, the device position server 120 of the location server 104 may determine a device position of the mobile device 116 relative to the cruise ship. Referring to FIG. 2B, an example layout of a cruise ship, the cruise ship 210 may have a main pool 212, pool bar 214, children's pool 216, restaurant 218, night club/bar 220, kids club or childcare center 222, reception 224, and gift store 226 on its main deck. Specific gaming areas may be predetermined on the cruise ship 210. For example, games of chance may be played at the main pool 212, pool bar 214, and night club/bar 220 on the main deck. Games of chance may not be permitted to be played at the children's pool 216, restaurant 218, kids club or childcare center 222, reception 224, and gift store 226. In one example, passenger A 228 may want to play a game of chance while lounging at the main pool 212. The location server may determine that the device position of the mobile device is at or around the main pool area 212. In another embodiment, passenger B 230 may want to play a game of chance while at the kids club or childcare center 222. The location server 104 may determine that the device position of the mobile device is at or around the childcare center 222.

Referring back to FIG. 1, once the vessel position and device position are determined, the information may be associated with the mobile device and stored in the location database 113. The mobile device management server 102 may request and obtain location information for each mobile device from the location server 104. Once obtained, the mobile device management server 102 may determine whether the fund amount may be transferred to the mobile device. The determination may be based upon the rules stored in the rules database 114. For example, since passenger A is located at the main pool area where playing games of chance are permitted, the mobile device management server 102 may determine that the fund amount may be transferred to the mobile device 116 of passenger A.

However, since passenger B is located at the childcare center where playing games of chance are not permitted, the transfer of funds will be denied. In this embodiment, a denial message may be transmitted to the mobile device of passenger B. The denial message may also include at least one reason for the denial of the transfer fund request. For example, the denial message may display that games are chance are not permitted to be played in the childcare center.

Since passenger A is permitted to play the game of chance, the mobile device management server 102 may then determine whether there is enough funds in the user account 112. If there is not enough funds in the user account 112, the mobile device management server 102 may obtain passenger information, such as financial information, from the passenger main account 122 stored in the establishment server 108. For example, the mobile device management server 102 may obtain the passenger's credit card information in order to transfer the fund amount of $200.00 requested by the passenger. The $200.00 may then be transferred to the mobile device 116 via the entertainment server 106. The entertainment server 106 may also enable play of the game of chance on the mobile device 116 subsequent to the transfer of funds to the mobile device 116.

Prior to the transfer of the fund amount, the mobile device management server 102 may also user other criteria to determine whether to transfer the fund amount. For example, one criterion may be a time rule. A time stamp on the request for transfer of funds may be used to determine whether the game of chance may be played on the mobile device. If the time stamp was at 3 a.m., the game of chance may not be permitted to be played and the transfer of funds may be denied. If the time stamp was at 10 a.m., the game of chance may be permitted to be played and the transfer of funds may be approved. The time rule may also be updated based on different time zones.

In another example, one criterion may be the age of the passenger. If the user information obtained from the customer main account 122 indicates that the passenger is only 18 years old, based upon certain gaming rules, the game of chance may not be permitted to be played and the transfer of funds may be denied. It will now be appreciated that the mobile device management server 102 may use any other desired criteria to determine whether or not to transfer the fund amount to the mobile device 116.

Figure 2C:
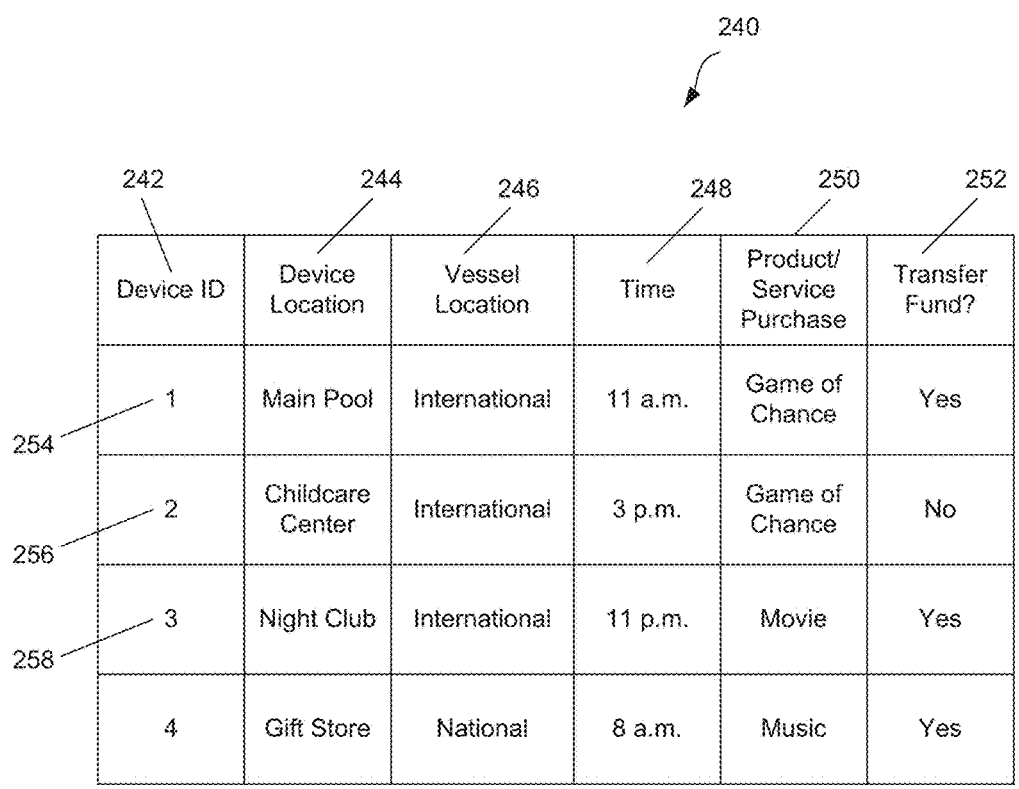
FIG. 2C illustrates an example rules table.

FIG. 2C illustrates an example rules table. The rules table may be stored, for example, in the rules database 114 illustrated in FIG. 1. The rules table 240 may include criteria used to determine whether to transfer the fund amount 252 to the mobile device. Each criterion may be associated with a device 242. As illustrated, the criteria may be based on device position or location 244, vessel position or location 246, time 248, and product or service requested 250.

Device 1 254 may be located at the main pool in international waters. A request to transfer funds to play a game of chance may be received at 11 a.m. Based on the device position, vessel position, and time rule, the mobile device management server 102 may determine that the fund amount may be transferred to the mobile device to play the game of chance.

Device 2 256 may be located at the childcare center in international waters. A request to transfer funds to play a game of chance may be received at 3 p.m. Based on the device position, vessel position, and time rule, the mobile device management server 102 may determine that the fund amount may not be transferred to the mobile device to play the game of chance.

Device 3 258 may be located at the night club in international waters. A request to transfer funds to watch an X-rated movie may be received at 11 p.m. Based on the device position, vessel position, and time rule, the mobile device management server 102 may determine that the fund amount may be transferred to the mobile device to watch the X-rated movie.

Figure 3:
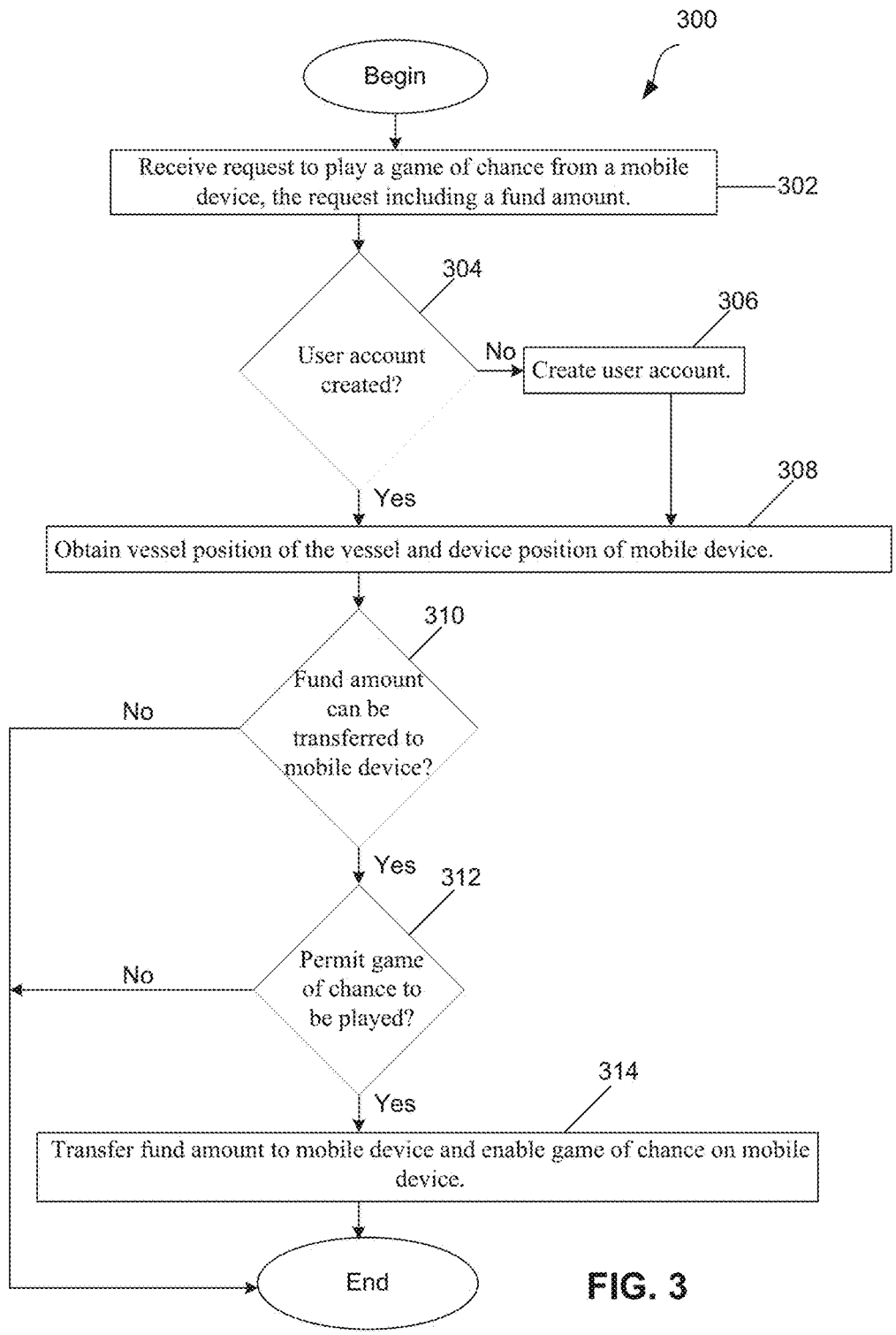
FIG. 3 illustrates an example method for the electronic transfer of funds to a mobile device.

FIG. 3 illustrates an example method for the electronic transfer of funds to a mobile device. Although example embodiments illustrate the vessel as a cruise ship, this is not intended to be limiting as the vessel may be used such an airplane, bus, car, train, riverboat, or any other movable transport device. The method 300 may begin with receipt of a request to play a game of chance from a mobile device at 302. The request may include a fund amount and transferred to an entertainment server, e.g. such as entertainment server 106 illustrated in FIG. 1. The entertainment server may transmit the request to an intermediary server, e.g. such as mobile device management server 102 illustrated in FIG. 1. The intermediary server may determine whether the passenger has a user account at 304. If the passenger does not have a user account, a user account may be created for the passenger 306.

The intermediary server may obtain a vessel position of the cruise ship and device position of the mobile device at 308. The vessel position and device position may be obtained from a location server, e.g. such as location server 104 illustrated in FIG. 1. The vessel position of the vessel may be a position relative to the world or earth. The device position of the mobile device may be a position relative to the vessel.

Once obtained, the intermediary server may determine whether the fund amount may be transferred to the mobile device at 310. The determination may be based upon the rules stored in a rules database, e.g. such as rules database 114 illustrated in FIG. 1. In one embodiment, the determination whether to transfer the fund amount may be based on at least the device position and the vessel position. In another embodiment, the determination whether to transfer the fund amount may be based on at least time rules, user information, available funds, establishment rules, or any other predetermined criteria. If the intermediary server determines that the transfer of the fund amount is not permitted at 310, the method 300 may end.

If the intermediary server determines that the transfer of the fund amount is permitted at 310, a determination of whether the game of chance is permitted to be played on the mobile device is made at 312. In one embodiment, the determination whether the game of chance is permitted to be played on the mobile device may be based on at least the device position and the vessel position. In another embodiment, the determination of whether the game of chance is permitted to be played on the mobile device may be based on at least time rules, user information, establishment rules, or any other predetermined criteria. If the intermediary server determines that the game of chance is not permitted to be played on the mobile device, the method 300 may end. If the intermediary server determines that the game of chance is permitted to be played on the mobile device, the fund amount may be transferred to the mobile device and the game of chance may be enabled on the mobile device at 314.

Figure 4:
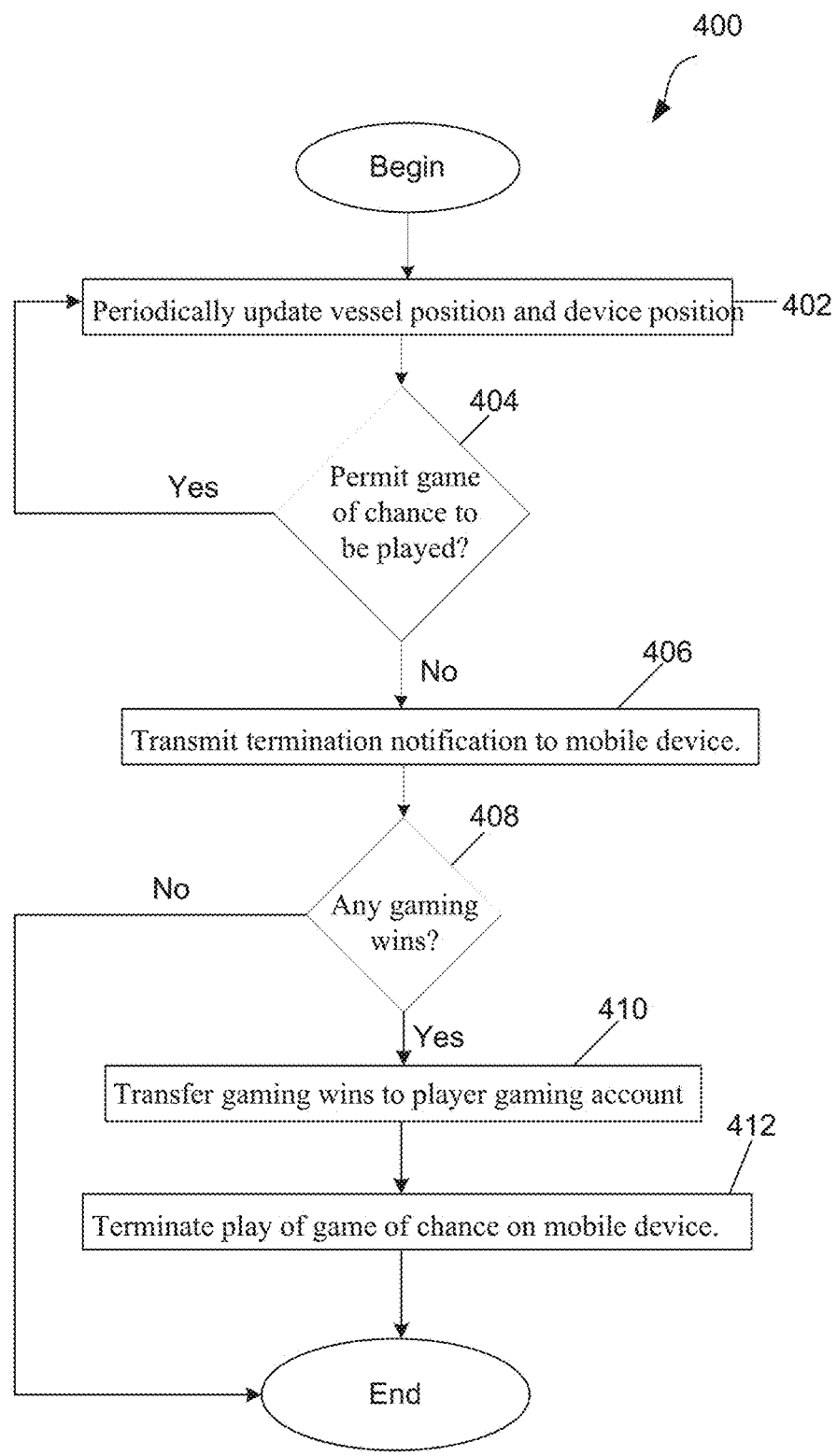
FIG. 4 illustrates another example method for the electronic transfer of funds to a mobile device.

FIG. 4 illustrates another example method for the electronic transfer of funds to a mobile device. The method 400 may begin with the vessel position and device position being periodically updated at 402. The vessel position and device position may be periodically updated by a location server, e.g. such as location server 104 illustrated in FIG. 1. Updating the vessel position and device position ensures that the restricted entertainment activities, playing the game of chance, are carried out only in allowable areas, environments and times. The intermediary server may determine whether the game of chance may be permitted to be played on the mobile device at 404. In one embodiment, the determination of whether the game of chance may be permitted to be played on the mobile device may be based upon the updated vessel position and updated device position. For example, although the original device position may have been in an area where playing games of chance is permitted, the updated device position may now indicate the mobile device is located at a location where playing games of chance is not permitted. In one embodiment, the determination of whether the game of chance may be permitted to be played on the mobile device may also be based upon an updated time as well. For example, although the time may have been a time when playing games of chance is permitted (e.g., 7 am-3 am), the updated time may now indicate the mobile gaming device is being played at a time when playing games of chance is not permitted (e.g. 3 am-7 am0.

If it is determined that the game of chance of is permitted to be played at 404, the method may continue at 402. If it is determined that the game of chance is not permitted to be played at 404, a termination notification may be transmitted to the mobile device at 406. In one embodiment, the termination notification may include at least one reason for termination of the game of chance. For example, the reason for termination may be based on the vessel position. The vessel may be entering into national waters from international waters. In another example, the reason for termination may be because the mobile device entered an unauthorized location where playing games of chance are not permitted. In still another example, the reason for termination may be because the time restriction to end play of the game of chance is imminent.

A determination may be made as to whether there are any gaming wins at 408. If the user has any wins and/or credits from playing the game of chance, the wins and/or credits may be stored in the user account in the intermediary server. Since wins and/or credits may not be transmitted back to a user's credit card or "reverse deposited", the wins and/or credits may be stored in the user account in the intermediary server. The passenger may reconcile and close out the user account in the intermediary server when the passenger's trip ends.

If there are no gaming wins at 408 or after transfer of the gaming wins to the user account in the intermediary server at 410, the game of chance may be terminated on the mobile device at 412.

Figure 5:
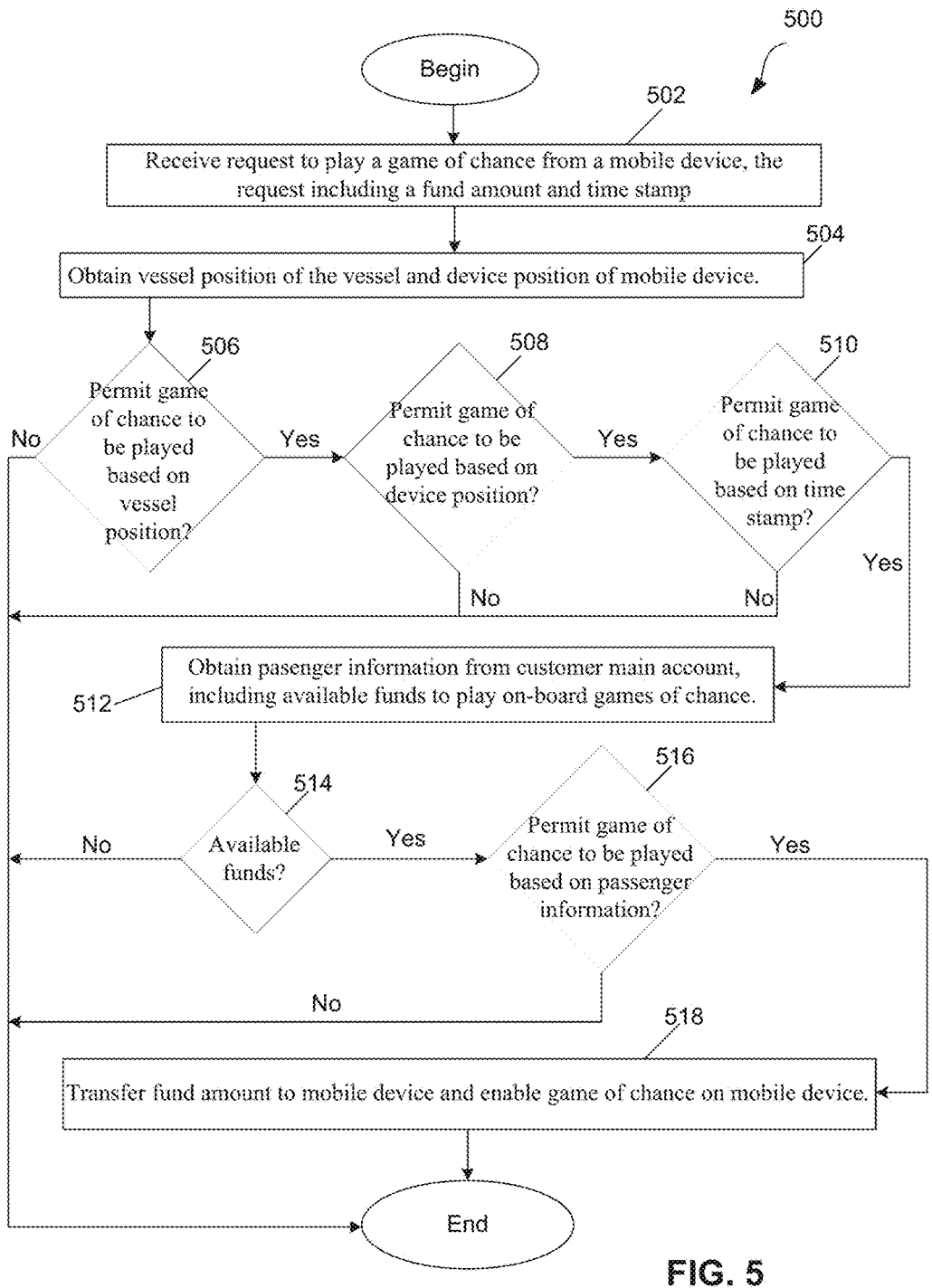
FIG. 5 illustrates another example method for the electronic transfer of funds to a mobile device.

FIG. 5 illustrates another example method for the electronic transfer of funds to a mobile device. The method 500 may begin with receipt of a request to play a game of chance from a mobile device at 502. The request may include a fund amount and time stamp. The request may be transferred to an entertainment server, e.g. such as entertainment server 106 illustrated in FIG. 1. The entertainment server may transmit the request to an intermediary server, e.g. such as mobile device management server 102 illustrated in FIG. 1.

The intermediary server may obtain a vessel position of the vessel and device position of the mobile device at 504. The vessel position and device position may be obtained from, for example, a location server e.g. such as location server 104 illustrated in FIG. 1. The vessel position of the vessel may be a position relative to the world or earth. The device position of the mobile device may be a position relative to the vessel.

Once obtained, the intermediary server may determine whether the game of chance may be played on the mobile device based upon the vessel position at 506. If it is determined that the game of chance may not be played on the mobile device based upon the vessel position at 506, the method 500 may end. If it is determined that the game of chance may be played on the mobile device based upon the vessel position at 506, a determination of whether the game of chance may be played on the mobile device based upon the device position at 508.

If it is determined that the game of chance may not be played on the mobile device based upon the device position at 508, the method 500 may end. If it is determined that the game of chance may be played on the mobile device based upon the device position at 508, a determination of whether the game of chance may be played on the mobile device based upon the time stamp at 510. If it is determined that the game of chance may not be played on the mobile device based upon the time stamp at 510, the method 500 may end. If it is determined that the game of chance may be played on the mobile device based upon the time stamp at 510, passenger information from the customer main account, including available funds to play on-board games of chance, may be obtained at 512. The determination of whether the game of chance may be played on the mobile device based upon the vessel position, device position, time stamp, or passenger information may be similar to the determination described above with respect to FIGS. 1, 2A, 2B, 3 and 4.

The passenger information obtained from the user account may be any information necessary to transfer funds to the mobile device. For example, the passenger information may include financial information such as credit card information, passenger address and phone number, passenger date of birth, and any other information necessary in the transfer of funds to the mobile device.

A determination of whether the passenger has available funds may be made at 514. In one embodiment, the passenger information may also include any information related to playing games of chance. For example, the passenger may have a daily fund amount or limit to play games of chance, such as restricting game play to only $200.00 per day. In another example, the passenger may have a total limit of $500.00 used to play games of chance for the entire trip. If it is determined that the passenger does not have available funds at 514, the method 500 may end. If it is determined that the passenger does have available funds at 514, a determination of whether the game of chance may be played on the mobile device based on passenger information may be made at 516. For example, if the passenger information includes the date of birth indicating that the passenger is 18 years old, based upon certain gaming rules, the intermediary server may determine that the game of chance may not be permitted to be played on the mobile device.

If it is determined that the game of chance may be played on the mobile device based on passenger information at 516, the fund amount may be transferred to the mobile device and the game of chance may be enabled on the mobile device at 518.

Figure 6:
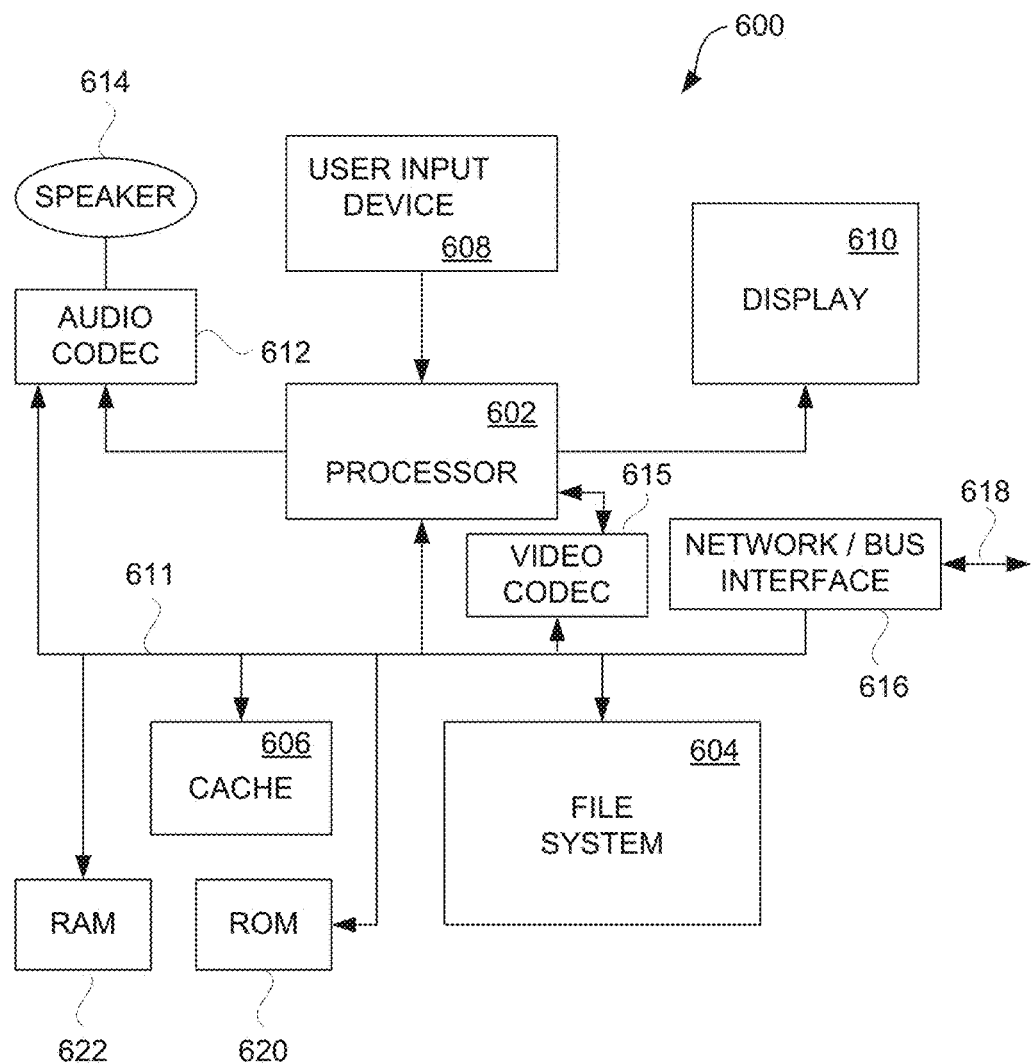
FIG. 6 illustrates an example block diagram of a computing device.

FIG. 6 illustrates an example block diagram of a computing device 600. The computing device 600 can represent circuitry of a representative computing device (e.g. mobile device, mobile device management sever, location server, establishment server, entertainment server) described and illustrated in FIG. 1. The computing device can be designed to primarily stationary or can be portable.

The computing device 600 includes a processor 602 that pertains to a microprocessor or controller for controlling the overall operation of the computing device 600. The computing device 600 stores data pertaining to passengers, products and services, location, and the like in a file system 604 and a cache 606. The file system 604 is, typically, semiconductor memory (e.g., Flash memory) and/or one or more storage disks. The file system 604 typically provides high capacity storage capability for the computing device 600. However, since the access time to the file system 604 can be relatively slow, the computing device 600 can also include the cache 606. The cache 606 is, for example, Random-Access Memory (RAM). The relative access time to the cache 606 is typically shorter than for the file system 604. However, the cache 606 does not have the large storage capacity of the file system 604. The computing device 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The computing device 600 may also include a user input device 608 that allows a user of the computing device 600 to interact with the computing device 600. For example, the user input device 608 can take a variety of forms, such as a button, keypad, dial, touch-sensitive surface, joystick, and the like. Still further, the computing device 600 includes a display 610 (screen display) that can be controlled by the processor 602 to display information to the user. A data bus 611 can facilitate data transfer between at least the file system 604, the cache 606, the processor 602, an audio coder/decoder (CODEC) 612 and/or a video CODEC 615.

In one embodiment, for example, if the computing device 600 (e.g. mobile device 116, establishment server 108, mobile device management server 102, location server 104, entertainment server 106 illustrated in FIG. 1) is a mobile gaming device, the computing device 600 may store a plurality of games of chance in the file system 604. When a user desires to have the computing device play a particular game of chance, a list of available games of chance is displayed on the display 610. Then, using the user input device 608, a user can select one of the games of chance to play. The processor 602, upon receiving a selection of a particular media item, supplies the game of chance data to one or more appropriate output devices. If the particular media item is encrypted, the particular media item is first decrypted as noted above, which could involve one or more layers of encryption. As an example, for audio output, the processor 602 can supply the media data (e.g., audio file) for the particular media item to the audio CODEC 612. The audio CODEC 612 can then produce analog output signals for a speaker 614. The speaker 614 can be a speaker internal to the computing device 600 or external to the computing device 600. For example, headphones or earphones that connect to the computing device 600 would be considered an external speaker. As another example, for video output, the processor 602 can supply the media data (e.g., video file) for the particular media item to the video CODEC 615. The video CODEC 615 can then produce output signals for the display 610 and/or the speaker 614.

The computing device 600 also includes a network/bus interface 616 that couples to a data link 618. The data link 618 allows the computing device 600 to couple to another device (e.g., a host computer, a power source, or an accessory device). The data link 618 can be provided over a wired connection or a wireless connection. In the case of a wireless connection, the network/bus interface 616 can include a wireless transceiver.

The various aspects, features, embodiments or implementations of the invention described above can be used alone or in various combinations. Embodiments of the invention can, for example, be implemented by software, hardware, or a combination of hardware and software. Embodiments of the invention can also be embodied as computer readable code on a computer readable medium. The computer readable medium is any data storage device that can store data, which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment", "an embodiment", "one example" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

What is claimed is:

1. A mobile gaming management device configured to transfer funds for passengers on a vessel, the mobile gaming management device comprising:
    at least one memory configured to store at least one passenger gaming account; and
    a processor configured to track gaming funds for use by at least one user of a mobile device, the processor configured to:
        receive a vessel position and a mobile device position;
        receive a fund request including a fund amount;
        obtain the fund amount, the fund amount used to play an on-board game of chance on the mobile device;
        transfer the fund amount to the mobile device based upon the vessel position and the mobile device position, wherein the mobile device position is a position of the mobile device relative to the vessel, and wherein the vessel position is a global position of the vessel;
        separately manage usage of the fund amount in the at least one passenger gaming account, the at least one passenger gaming account associated with the user playing the on-board game of chance;
        accumulate any gaming wins from the on-board game of chance in the at least one passenger gaming account associated with the user; and
        close the at least one passenger gaming account associated with the user at the conclusion of a vessel route for the vessel.

2. The mobile gaming management device of claim 1, wherein the processor is further configured to:
    deny transfer of the fund amount to the mobile device if the fund amount cannot be transferred to the mobile device based upon the vessel position and the mobile device position.

3. The mobile gaming management device of claim 1, wherein the processor is configured to communicate with a vessel management device, the vessel management device having a main account including credit or debit account information for the at least one user of the mobile device from which the funds can be obtained.

4. The mobile gaming management device of claim 1, wherein the processor is further configured to:

determine when the on-board game of chance is completed; and determine whether there are any gaming wins from playing the on-board game of chance.

5. A mobile gaming management apparatus configured to provide funds for patrons of bet-based gaming, the mobile gaming management apparatus comprising:

at least one memory configured to store at least one patron gaming account; and a processor configured to track gaming funds for use by at least one patron of a mobile device, the processor configured to:

receive a fund request including a fund amount;

obtain the fund amount, the fund amount used to play a bet-based game on the mobile device;

render the fund amount available for use by the at least one patron on the mobile device based at least on a vessel position and a device position, wherein the device position is a position of the mobile device relative to the vessel, and wherein the vessel position is a global position of the vessel;

manage usage of the fund amount in the patron gaming account, the patron gaming account associated with the at least one patron playing the bet-based game;

accumulate any gaming wins from the bet-based game in the patron gaming account; and subsequently close the gaming account for the patron after the bet-based game is no longer available to the patron on the mobile device.

6. The mobile gaming management apparatus of claim 5, wherein the mobile gaming management apparatus is provided for a vessel, and wherein the at least one patron is a passenger of the vessel.

7. The mobile gaming management apparatus of claim 6, wherein the vessel travels to a destination, and wherein the processor is configured to close the gaming account for the patron at the conclusion when the vessel is at the destination.

8. The mobile gaming management apparatus of claim 5, wherein the bet-based game is a game of chance.

9. The mobile gaming management apparatus of claim 5, wherein the bet-based game is a sports bet.

10. A mobile gaming management apparatus configured to provide funds for patrons of bet-based gaming, the mobile gaming management apparatus comprising:

at least one memory configured to store at least one patron gaming account; and a processor configured to track gaming funds for use by at least one patron of a mobile device, the processor configured to:

identify a fund amount used for playing a bet-based game on the mobile device;

render the fund amount available for use by the at least one patron on the mobile device based at least on a vehicle position and a device position, wherein the device position is a position of the mobile device relative to the vehicle, and wherein the vehicle position is a position of the vehicle;

manage usage of the fund amount in the patron gaming account, the patron gaming account associated with the at least one patron playing the bet-based game; and track game play of the at least one patron in the patron gaming account.

11. The mobile gaming management device of claim 10, wherein the vehicle position is a global position of the vehicle.

12. The mobile gaming management apparatus of claim 10, wherein the bet-based game is a game of chance.

13. The mobile gaming management apparatus of claim 10, wherein the bet-based game is a sports bet.

14. The mobile gaming management apparatus of claim 10, wherein the processor is configured to close the patron gaming account for the at least one patron after the bet-based game is no longer available to the patron on the mobile device.

15. The mobile gaming management apparatus of claim 10, wherein the vehicle departs from a departure location and travels to a destination location, and wherein the processor is configured to close the patron gaming account after the vehicle has reached the destination location.

16. The mobile gaming management apparatus of claim 10, wherein the processor, in operating to render the fund amount available for use by the at least one patron on the mobile device, is configured to:

obtain at least one vehicle gaming rule from a rules database; and determine whether the fund amount is available for use by the at least one patron based on at least the at least one vehicle gaming rule.

17. The mobile gaming management apparatus of claim 10, wherein the bet-based game is a game of chance, and wherein the processor, in operating to render the fund amount available for use by the at least one patron on the mobile device, is configured to: obtain at least one vehicle gaming rule, and determine whether the fund amount is available for use by the at least one patron based on at least the at least one vehicle gaming rule.

18. The mobile gaming management apparatus of claim 16, wherein the at least one vehicle gaming rule is a predefined time rule permitting play of the bet-based game.

19. The mobile gaming management apparatus of claim 16, wherein the at least one vehicle gaming rule includes at least one predefined geographic region.

20. The mobile gaming management apparatus of claim 16, wherein the at least one vehicle gaming rule includes at least one predetermined gaming region and at least one control parameter associated with the at least one predetermined gaming region.

* * * * *